(12) United States Patent
Mori et al.

(10) Patent No.: US 9,630,382 B2
(45) Date of Patent: Apr. 25, 2017

(54) LAMINATE FILM FOR DECORATIVE MOLDING

(75) Inventors: Kentaro Mori, Otsu (JP); Katsuhiro Minomo, Otsu (JP)

(73) Assignee: Toray Industries, Inc. (JP)

( * ) Notice: Subject to any disclaimer, the term of this patent is extended or adjusted under 35 U.S.C. 154(b) by 227 days.

(21) Appl. No.: 13/822,801

(22) PCT Filed: Aug. 26, 2011

(86) PCT No.: PCT/JP2011/069263
§ 371 (c)(1),
(2), (4) Date: Mar. 13, 2013

(87) PCT Pub. No.: WO2012/035955
PCT Pub. Date: Mar. 22, 2012

(65) Prior Publication Data
US 2013/0168011 A1    Jul. 4, 2013

(30) Foreign Application Priority Data

Sep. 15, 2010  (JP) .................................. 2010-206498

(51) Int. Cl.
| | |
|---|---|
| B32B 27/32 | (2006.01) |
| B32B 27/20 | (2006.01) |
| B29C 51/14 | (2006.01) |
| B44C 1/17 | (2006.01) |
| C08J 7/04 | (2006.01) |

(Continued)

(52) U.S. Cl.
CPC .............. *B32B 27/32* (2013.01); *B29C 51/14* (2013.01); *B32B 27/20* (2013.01); *B44C 1/1712* (2013.01); *C08J 7/042* (2013.01); *C08J 7/123* (2013.01); *C08J 7/18* (2013.01); *B29C 51/10* (2013.01); *B29C 51/266* (2013.01); *B32B 2307/402* (2013.01); *B32B 2451/00* (2013.01); *C08J 2323/12* (2013.01); *C08J 2423/02* (2013.01); *Y10T 428/2878* (2015.01)

(58) Field of Classification Search
CPC ... B29C 45/14811; B29C 51/14; B29C 51/10; B29C 51/266; B29K 2633/08; B29K 2995/002; B29K 2995/0026; Y10T 428/24802; Y10T 428/24843; Y10T 428/2878; C08J 7/042; C08J 7/18; C08J 2323/12; C08J 2423/02; B32B 27/32; B32B 2451/00; B32B 2307/402; B44C 1/1712
USPC ........................................... 156/239; 428/355
See application file for complete search history.

(56) References Cited

U.S. PATENT DOCUMENTS 3,276,904 A * 10/1966 Palmer ..................... B05D 5/06
                                                            427/270
4,207,220 A *  6/1980 Godfrey ........................ 524/274
(Continued)

FOREIGN PATENT DOCUMENTS

| JP | 04259546 A | * | 9/1992 |
| JP | 07258335 A | * | 10/1995 |

(Continued)

*Primary Examiner* — Philip Tucker
*Assistant Examiner* — Vicki Wu
(74) *Attorney, Agent, or Firm* — DLA Piper LLP (US)

(57) ABSTRACT

A decorative molding film includes a base film provided with a protective layer, a coloring layer containing a polyolefin based hot melt adhesive and pigment, and an adhesive layer containing a polyolefin based hot melt adhesive, stacked in that order on one side of the base film.

3 Claims, 1 Drawing Sheet

(51) Int. Cl.
*C08J 7/18* (2006.01)
*C08J 7/12* (2006.01)
*B29C 51/10* (2006.01)
*B29C 51/26* (2006.01)

(56) References Cited

U.S. PATENT DOCUMENTS

| | | | |
|---|---|---|---|
| 4,612,052 A * | 9/1986 | Schwartz | C09D 11/02 |
| | | | 106/31.61 |
| 4,657,537 A * | 4/1987 | Zimmerer | 604/360 |
| 4,725,506 A * | 2/1988 | Nagano | 428/516 |
| 5,244,524 A * | 9/1993 | Yamane | 156/230 |
| 5,525,676 A * | 6/1996 | Kitayama | C09D 151/06 |
| | | | 430/536 |
| 2001/0019761 A1* | 9/2001 | Iriyama | 428/200 |
| 2005/0003174 A1* | 1/2005 | Ikeda et al. | 428/219 |
| 2007/0116903 A1* | 5/2007 | Song | B05D 1/286 |
| | | | 428/31 |
| 2008/0026660 A1* | 1/2008 | Ogawa et al. | 442/328 |
| 2010/0227970 A1* | 9/2010 | Nishioka | C08L 23/283 |
| | | | 524/570 |
| 2011/0159261 A1* | 6/2011 | Sugimoto et al. | 428/215 |

FOREIGN PATENT DOCUMENTS

| | | | |
|---|---|---|---|
| JP | 2000-043094 A | | 2/2000 |
| JP | 2000043094 A | * | 2/2000 |
| JP | 2001-219442 A | | 8/2001 |
| JP | 3419886 B2 | | 6/2003 |
| JP | 2004-000947 A | | 1/2004 |
| JP | 2005035243 A | * | 2/2005 |
| JP | 2006-037072 A | | 2/2006 |
| JP | 2006037072 A | * | 2/2006 |
| JP | 2009078394 A | * | 4/2009 |
| JP | 4374262 B2 | | 12/2009 |
| WO | WO 0051829 | * | 9/2000 ....... B29C 45/14811 |

* cited by examiner

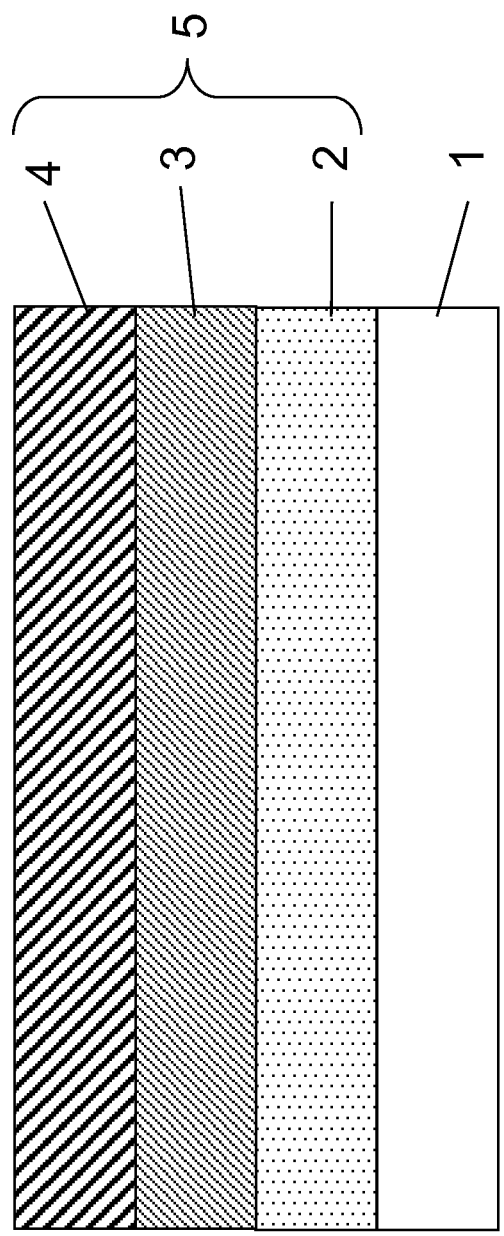

LAMINATE FILM FOR DECORATIVE MOLDING

RELATED APPLICATIONS

This application is a §371 of International Application No. PCT/JP2011/069263, with an international filing date of Aug. 26, 2011 (WO 2012/035955 A1, published Mar. 22, 2012), which is based on Japanese Patent Application No. 2010-206498, filed Sep. 15, 2010, the subject matter of which is incorporated herein by reference.

TECHNICAL FIELD

This disclosure relates to a laminate film for decoration of moldings intended for use in automobile parts and electric appliances.

BACKGROUND

In the field of industrial materials such as automobile parts and electric appliances, conventional methods applied for decoration of moldings for indoor and outdoor uses include a process in which a decorative layer composed of an adhesion layer, coloring layer, and protective layer is formed on top of a molding by spraying paint to produce these layers. This process, however, requires many steps and costs as baking is necessary for each layer that constitutes the decorative layer. In addition, it has the problem of an increased release of volatile organic compounds and $CO_2$ that can cause a large environmental load. This problem has been solved in recent years by new film decoration methods such as vacuum molding and air-pressure molding that can decorate moldings of a three-dimensional shape.

Moldings to be decorated, on the other hand, may be of different materials such as metals and resins, of which resins have been widely used as material of moldings from the viewpoint of light weight, rustproofing properties, and high moldability. In the field of industrial materials such as automobile parts and electric appliances, in particular, the consumption of polyolefin based resins, which are chemical resistant, water resistant, and heat resistant, though low-priced, has been increasing sharply. Polyolefin based resins, however, have the problem of lacking functional groups that can contribute to reactions, and they are poor in adhesiveness because of being crystalline.

As a method to solve this problem, formation of a primer layer on polyolefin based resin products has been proposed (Japanese Unexamined Patent Publication (Kokai) No. 2004-947). It has also been proposed to provide a base coat film layer that can serve also as a primer (Japanese Unexamined Patent Publication (Kokai) No. 2006-37072). On the other hand, there is another proposal of a film decoration method that takes into account the stretchability of coat films.

With the method proposed in JP '947, however, adhesion between the primer coat layer and the base coat layer decreases. With the method proposed in JP '072, it is impossible to maintain sufficient adhesion between the polyolefin based resin and the coat film layer after water resistance test.

The methods proposed in JP '947 and JP '072 which assume the use of spray coating, furthermore, cannot produce a coat film with high stretchability and cannot serve at all as a decoration method for a film that requires high moldability.

With the methods proposed in JP '886 and JP '262 which take into account stretchability of coating films, on the other hand, sufficient adhesion cannot be achieved between the primer coating layer and the base coating layer when film decoration is performed on a polyolefin resin product.

Thus, it could be helpful to provide a laminate film high in adhesiveness to polyolefin based resins, high in moldability, and suitable for decorative molding.

SUMMARY

We thus provide laminate films composed mainly of a base film provided with a protective layer, a coloring layer containing a polyolefin based hot melt adhesive and pigment, and an adhesive layer containing a polyolefin based hot melt adhesive, stacked in this order on one side of the base film.

In addition, our decorated moldings production method uses our decorative molding film. Specifically, the decorated moldings production method consists mainly of the step of applying our decorative molding film to a molding by heat molding and a subsequent step of peeling off the base film.

In the decorative molding film, the pigment-containing coloring layer further contains a polyolefin based hot melt adhesive, ensuring strong adhesion between the coloring layer and the adhesive layer. In addition, the coloring layer contains a polyolefin based hot melt adhesive, ensuring decreased stretching stress for the coloring layer and high moldability during heat molding. As a result, the decorative molding film produces good decorated moldings even when applied to moldings having a deep-drawn portion (concave portion) with a large molding ratio.

The adhesive layer in the decorative molding film, furthermore, contains a polyolefin based hot melt adhesive and, therefore, can strongly adhere to a molding containing polyolefin resin when subjected to heat molding.

BRIEF DESCRIPTION OF THE DRAWINGS

FIG. 1 illustrates a schematic cross section view of our decorative molding film.

EXPLANATION OF NUMERALS 1. base film
2. protective layer
3. coloring layer
4. adhesive layer
5. decorative layer

DETAILED DESCRIPTION

Our decorative molding film is mainly composed of a base film provided with a protective layer, coloring layer containing a polyolefin based hot melt adhesive and pigment, and adhesive layer containing a polyolefin based hot melt adhesive, stacked in this order on one side of the base film.

This decorative molding film is bonded to a molding by heat molding while maintaining the adhesive layer in contact with the surface of the non-decorated body, and then only the base film is peeled off to obtain a decorated molding consisting of the non-decorated body and a composite layer composed of a protective layer, coloring layer and adhesive layer formed on the former. Hereinafter, the composite layer composed of a protective layer, coloring layer, and adhesive layer is referred to as "decorative layer." The decoration process using the decorative molding film decreases the number of steps required for decorative layer formation and improve production efficiency for moldings containing a decorative layer, as compared to decoration processes using spray coating which require a large number of steps. This serves to reduce the cost required for production of decorated moldings. It also serves to decrease the release of environmental load of substances such as volatile organic compounds and $CO_2$.

The coloring layer contains the same polyolefin based hot melt adhesive as that contained in the adhesive layer and this leads to improved adhesion between the coloring layer and the adhesive layer. In addition, since the coloring layer contains a polyolefin based hot melt adhesive, the coloring layer will be plasticized and the coloring layer will easily follow the shape of the molding at high temperatures during the molding process. As a result, the moldability of the decorative molding film in the coloring layer can be improved, and deep-drawn portions of the molding can be molded properly.

There are no specific limitations on the base film as long as the film has a rupture elongation of 150% or more at 100° C. For instance, a useful film can be produced by processing a thermoplastic resin such as polyolefin, polyester, polyvinyl chloride, poly(meth)acrylate, polyamide, polyester amide, polyether, polystyrene, polyether ester, and polycarbonate. Furthermore, it may be in the form of an unstretched film, uniaxially stretched film, or biaxially stretched film. The base film may be either a monolayer film or a laminate film composed of two or more layers produced by coextrusion, lamination, mold-release coating, or the like.

It is preferable that the base film has a thickness of 75 μm or more and 500 μm or less from the viewpoint of the rupture strength and shape retention of the molding after the molding process. The thickness is more preferably 100 μm or more and 300 μm or less, particularly preferably 150 μm or more and 250 μm or less. The thickness of a base film can be measured by using a micrometer according to JIS C-2151 (2006).

The protective layer is the outermost layer of the decorated molding resulting from decorative molding of a molding using a decorative molding film. Accordingly, it is necessary for the protective layer to be a resin that does not impair moldability of the decorative molding film and have decorative characteristics such as transparency and glossiness as well as good coating characteristics such as abrasion resistance, impact resistance, chemical resistance, and weather resistance. Such a resin may be a thermosetting resin, light curing resin, or ultraviolet ray curing resin. Useful thermosetting resins include, for instance, polycarbonate resin, acrylic resin, polyester resin, phenoxy resin, epoxy resin, and polyolefin resin. The light curing resin and the ultraviolet ray curing resin may be, for instance, one or more selected from the group consisting of urethane acrylate resin, polyester acrylate resin, unsaturated polyester resin, silicone acrylate resin, and epoxy acrylate resin, which may be combined with an appropriate light initiator as required. These resins may contain a curing agent, curing accelerator, binding agent, surface adjustor, pigment, plasticizer, ultraviolet absorber, and photostabilizer as needed. Furthermore, these resins may be either a copolymer or a mixture of heterogeneous resins. If a light curing resin or an ultraviolet ray curing resin is used, it is preferable to perform curing treatment after molding to maintain a high moldability.

It is preferable that the protective film has a thickness of 10 μm or more and 70 μm or less. A thickness of 10 μm or more allows the protective layer to have coating characteristics as described above. If the thickness is 70 μm or less, the film will have a flat surface while being not too thick, and a coloring layer can be formed easily on it. The lower limit of the thickness is more preferably 20 μm or more. The upper limit of the thickness is more preferably 50 μm or less. The thickness of a protective film can be measured by using a micrometer according to JIS C-2151 (2006).

It is necessary for the surface of the base film in contact with the protective layer to have releasability from the protective layer. "Having releasability" means that the base film can be peeled off from the protective layer. These characteristics are necessary to leave a decorative layer on a decorated molding by peeling off only the base film after a decorative molding film is bonded to a molding by heat molding while maintaining the adhesive layer in contact with the surface of a non-decorated molding as described above. For the base film surface in contact with the protective layer to have releasability from the protective layer, it is preferable that the base film surface that comes in contact with the protective layer has a wetting tension of 20 mN/m or more and 55 mN/m or less. A wetting tension of 20 mN/m or more ensures that the coat film has a smooth surface without suffering from cissing during the protective layer formation step, allowing a coloring layer to be easily formed on it. A wetting tension of 55 mN/m or less ensures that the base film can be peeled off easily from the protective layer. It is more preferable that the lower limit of the wetting tension is 25 mN/m or more. It is more preferable that the upper limit of the wetting tension is 50 mN/m or less. Wetting tension can be controlled by adding one or more polymers with a known wetting tension as a component of the base film. Alternatively, the base film surface that comes in contact with the protective layer may be coated or corona-treated for its control. For instance, resins with a known wetting tension include polyolefin 25 mN/m or more and 40 mN/m or less, polyester 35 mN/m or more and 45 mN/m or less, polyvinyl chloride 35 mN/m or more and 45 mN/m or less, poly(meth)acrylate 37 mN/m or more and 43 mN/m or less, and polystyrene 30 mN/m or more and 35 mN/m or less, which may be used singly or in combination to produce a base film. After producing a base film by using these resins singly or in combination, its surface that comes in contact with a protective layer may further be coated or corona-treated to adjust the wetting tension to 20 mN/m or more and 55 mN/m or less. Wetting tension can be measured according to JIS K-6768 (1999).

The adhesive layer is a resin layer that contains a polyolefin based hot melt adhesive. There are no specific limitations on the polyolefin based hot melt adhesive as long as it is produced from a resin such as crystalline polypropylene, amorphous polypropylene, ethylene-propylene copolymer, propylene-butene copolymer, ethylene-propylene-butene copolymer, and ethylene-vinyl acetate copolymer. These resins may be used singly or as a mixture of two or more thereof. These resins may contain a solvent, curing agent, curing accelerator, binding agent, surface adjustor, pigment, plasticizer, ultraviolet absorber, and photostabilizer as needed.

It is preferable that the content of the polyolefin based hot melt adhesive is 20 mass % or more of the entire adhesive layer. A polyolefin based hot melt adhesive content of 20 mass % or more ensures that the adhesive layer can be strongly bonded to a molding formed of a polyolefin resin.

It is preferable that the polyolefin based hot melt adhesive has a melting point Tm of 50° C. or more and 100° C. or less. A melting point Tm of 50° C. or more is preferable to ensure that the adhesive layer has a high storage stability at high temperatures in summer. A melting point Tm of 100° C. or less is preferable to ensure that the low temperature moldability will improve and that the adhesiveness of a molding formed of polyolefin resin will improve. It is more preferable that the lower limit of the melting point Tm is 60° C./m or more. It is more preferable that the upper limit of the melting point Tm is 90° C./m or less. The melting point Tm is defined as the maximum absorption peak temperature measured by differential scanning calorimetry according to JIS K-7121 (1987).

It is preferable that the polyolefin based hot melt adhesive is a modified polyolefin resin based adhesive to ensure compatibility with polar resins and solubility in solvents. A modified polyolefin resin is a polyolefin resin modified with chlorine, an unsaturated carboxylic acid, acrylic compound, vinyl compound or the like. Useful modified polyolefin resins include those modified with one selected from the group consisting of chlorine, an unsaturated carboxylic acid, acrylic compound, vinyl compound, and the like, and those modified with two or more thereof. Furthermore, these modified polyolefin resins may be used singly or in combination. The use of a modified polyolefin resin serves to improve the compatibility with polar resins and solubility in solvents while maintaining adhesiveness to a molding formed of a polyolefin resin.

It is preferable that the modified polyolefin resin has a weight average molecular weight Mw of 20,000 or more and 200,000 or less. A weight average molecular weight Mw of 20,000 or more ensures a high adhesiveness to a molding formed of polyolefin resin as well as a high water resistance. A weight average molecular weight Mw of 200,000 or less ensures a high compatibility with polar solvents, an improved solubility in solvents, moldability at low temperatures, and adhesiveness to a molding formed of polyolefin resin. It is more preferable that the lower limit of the weight average molecular weight Mw is 40,000 or more. It is more preferable that the upper limit of the weight average molecular weight Mw is 150,000 or less. The weight average molecular weight Mw can be measured by liquid chromatography according to JIS K-0124 (2002).

It is preferable that the adhesive layer has a thickness of 5 μm or more and 50 μm or less. An adhesive layer with a thickness of 5 μm or more can allow a molding to have adhesiveness. An adhesive layer with a thickness of 50 μm or less can have a flat surface while being not too thick. The lower limit of the thickness is more preferably 10 μm or more. The upper limit of the thickness is more preferably 40 μm or less. The thickness of an adhesive film can be measured by using a micrometer according to JIS C-2151 (2006).

The coloring layer is a resin layer that contains at least a binder resin, pigment, and polyolefin based hot melt adhesive.

Useful binder resins include thermosetting resin, thermoplastic resin, light curing resin, and ultraviolet ray curing resin. Useful thermosetting resins include unsaturated polyester resin, phenol resin, epoxy resin, acrylic resin, urethane resin, melamine resin, urea resin, and polycarbonate resin, and a solvent is added to them and stirred before use. Useful thermoplastic resins include polyethylene resin, polypropylene resin, polycarbonate resin, acrylic resin, and polystyrol resin, and a solvent is added to them and stirred before use. The light curing resin and the ultraviolet ray curing resin may be, for instance, one or more selected from the group consisting of urethane acrylate resin, polyester acrylate resin, unsaturated polyester resin, silicone acrylate resin, and epoxy acrylate resin, which may be combined with an appropriate light initiator as required. These resins may contain a curing agent, curing accelerator, binding agent, surface adjustor, dye, plasticizer, ultraviolet absorber, and photostabilizer as required. Furthermore, these resins may be either a copolymer or a mixture of heterogeneous resins. It is preferable that the binder resin to be use is a thermosetting resin from the viewpoint of high handleability and low price. In particular, it is preferable to use a mixture containing a urethane resin and an acrylic resin from the viewpoint of moldability.

Useful pigments include both inorganic pigments and organic pigments such as, for instance, aluminum powder, carbon black, titanium dioxide, mica, phthalocyanine green, and dioxazine violet. These pigments may be used singly or as a mixture of two or more thereof. The concentrations of these pigments may be adjusted in an appropriate range where they do not impede the rupture elongation of the binder resin contained.

As the polyolefin based hot melt adhesive, it is possible to use a polyolefin based hot melt adhesive of a type and having characteristics as described above. It is preferable that the polyolefin based hot melt adhesive to be used is one formed of a modified polyolefin resin. As this modified polyolefin resin, it is possible to use a modified polyolefin resin of a type and having characteristics as described above.

The polyolefin based hot melt adhesive contained in the adhesive layer may be either identical to or different from the polyolefin based hot melt adhesive contained in the coloring layer.

It is preferable that the content of the polyolefin based hot melt adhesive is 2 mass % or more and 8 mass % or less of the entire coloring layer. A content of 2 mass % or more ensures improved adhesion between the coloring layer and the adhesive layer. A content of 8 mass % or less ensures that the moldability of the coloring layer can be improved to a large extent while preventing significant changes in the color of the coloring layer during heat molding of the modified polyolefin resin at or above the melting point Tm. As a result, moldability of the decorative molding film containing the coloring layer can be improved and the moldability of deep-drawn portions of the molding can also be improved. The lower limit of the content is more preferably 3 mass % or more. The upper limit of the content is more preferably 7 mass % or less.

It is preferable that the coloring layer has a thickness of 15 μm or more and 50 μm or less. A thickness of 15 μm or more ensures that a coloring layer with an intended color is obtained. A thickness of 50 μm or less ensures that the film has a flat surface while being not too thick, and an adhesive layer can be formed easily on the coloring layer. The lower limit of the thickness is more preferably 20 μm or more. The upper limit of the thickness is more preferably 40 μm or less. The thickness can be measured by using a micrometer according to JIS C-2151 (2006).

The coloring layer may cover the surface of the adhesive layer (or the protective layer) entirely or partially. Furthermore, a coloring layer covering the entire surface and another coloring layer covering part of the surface may be provided one on top of the other. In the case where a coloring layer covering the entire surface and another coloring layer covering part of the surface are provided one on top of the other, it is preferable that both coloring layers meet the characteristics requirements described above.

There are no specific limitations on the method to be used for production of a decorated molding containing the decorative molding film as long as it is a generally known heat molding method such as vacuum molding and air-pressure molding that can serve to decorate a molding with a three-dimensional shape. From the viewpoint of moldability of the decorative molding film and its adhesiveness to a molding, it is preferable that a molding consisting of a non-decorated body provided with a composite layer composed of a protective layer, coloring layer and adhesive layer formed on its surface is produced as follows: a decorative molding film is heated under vacuum conditions at a temperature equal to or higher than the softening point of the base film and bonded by heat molding to a molding with the adhesive layer of the film maintained in contact with the surface of the non-decorated product, followed by peeling off the base film. This decoration process decreases the number of steps required for decorative layer formation and improves production efficiency for moldings provided with a decorative layer as compared to decoration processes using spray coating which require a large number of steps.

EXAMPLES

Our films and methods will now be illustrated with reference to Examples, but it should be understood that this disclosure is not construed as being limited thereto. The methods used for evaluation of samples prepared in Examples and Comparative Examples are as described below. In Examples and Comparative Examples given below, a dry-laminated film composed of an unstretched polyethylene terephthalate film with a thickness of 100 μm (FL10, wetting tension 45 mN/m, supplied by Toray Industries, Inc.) and an unstretched polypropylene film with a thickness of 40 μm (SC, wetting tension 28 mN/m, supplied by Tohcello Co., Ltd.) was used as base film.

(1) Moldability of Decorative Molding Film

A decorative molding film was subjected to tensile test using a tensile tester (Tensilon tester UCT-100, supplied by Orientec Co., Ltd.) under the conditions of an initial chuck distance of 50 mm and a tension speed of 300 mm/min. To make measurements, a film sample was held in a constant temperature bath controlled at 100° C. and tensile test was started after 60 seconds of preheating to determine the stretching stress at a stretching ratio of 300%. For each sample, measurements were made at three points and the average of the three measurements was taken to represent the stretching stress of the sample. It is considered that a decorative molding film with a lower stretching stress is higher in moldability.

(2) Color of Decorative Molding Film

A spectrophotometric colorimeter (CM-2500d, supplied by Konica Minolta Sensing, Inc.) was used to take $L^*a^*b^*$ measurements of a decorative molding film and a reference sample according to JIS Z-8730 (2009). The absolute difference between the $L^*a^*b^*$ colorimetric measurements of a decorative molding film and the $L^*a^*b^*$ colorimetric measurements of a reference sample was calculated to determine the chrominance $\Delta E$. A sample with a $\Delta E$ value of less than 1.0 was judged to be acceptable in terms of chrominance, whereas a sample with a $\Delta E$ value of 1.0 or more was judged to be defective in terms of chrominance. For each sample, $L^*a^*b^*$ measurements were made at three points and the average of the three measurements was taken to represent the $L^*a^*b^*$ value of the sample. To evaluate the dependence of the color of a film on the content of a polyolefin based hot melt adhesive contained in the coloring layer, the decorative molding film prepared in Comparative Example 1, whose coloring layer contained no polyolefin based hot melt adhesive, was used as a reference sample.

(3) Adhesion Between Decorative Molding Film and Molding

As a molding, a polyolefin resin plate with a length of 250 mm, width of 100 mm, and thickness of 3 mm was prepared. In a vacuum molding machine (NGF-0406-T, supplied by Fu-se Vacuum Forming Co., Ltd.), a decorative molding film and a molding were placed so that the adhesive layer surface of the former faced the largest surface of the latter. The film was heated at 100° C. under vacuum conditions to prepare a sample in which the film was bonded strongly to the molding. Then, this sample was exposed to ultraviolet ray with an illuminance of 2,000 mJ/cm². Subsequently, the base film was peeled off to provide a decorated molding. A sample for adhesiveness evaluation with a length 100 mm, width of 10 mm, and thickness of 3 mm was cut out of the resulting decorated molding. The decorative layer was peeled off from the widthwise edge of the adhesive portion of the sample, and 180° peeling test was performed using a tensile tester (Tensilon tester UCT-100, supplied by Orientec Co., Ltd.) at a tension speed of 300 mm/min to determine the peel strength. A sample was judged to be acceptable in terms of adhesiveness if it had a peel strength of 7 N/cm or more or if the decorative layer was destroyed and could not be peeled off. A sample was judged to be inferior in terms of adhesiveness if it had a peel strength of less than 7 N/cm or if peeling took place at the interface between the coloring layer and the adhesive layer. For each sample, measurements were made at three points and the average of the three measurements was used for evaluation.

Coating Composition

The following paint compositions A to D were prepared to form coloring layers and adhesive layers.

Coating Composition A

Coating composition A was prepared by mixing the following base resin and curing agent at the compounding ratio given below:

| | |
|---|---|
| base resin: R2325 (solid component 36 mass %, supplied by Nippon Bee Chemical Co., Ltd.) | 100 parts by mass |
| curing agent: D-178N (solid component 100 mass %, supplied by Mitsui Chemicals, Inc.) | 2 parts by mass. |

Coating Composition B

Coating composition B was prepared by mixing the following polyolefin based hot melt adhesive and solvent at the compounding ratio given below:

| | |
|---|---|
| polyolefin based hot melt adhesive: M-28 (maleic anhydride modified chlorinated polypropylene, supplied by Toyobo Co., Ltd.) | 20 parts by mass |
| solvent: toluene | 80 parts by mass. |

Coating Composition C

Coating composition C was prepared by mixing the following polyolefin based hot melt adhesive and solvent at the compounding ratio given below:

| | |
|---|---|
| polyolefin based hot melt adhesive: P-4000 (acrylic modified chlorinated polypropylene, supplied by Toyobo Co., Ltd.) | 30 parts by mass |
| solvent: toluene | 70 parts by mass. |

Coating Composition D

Coating composition D was prepared by mixing the following polyolefin based hot melt adhesive and solvent at the compounding ratio given below:

| | |
|---|---|
| polyolefin based hot melt adhesive: NS-2002 (maleic anhydride modified non-chlorinated polypropylene, supplied by Toyobo Co., Ltd.) | 20 parts by mass |
| solvent: toluene | 80 parts by mass. |

Example 1

The unstretched polypropylene film surface of the base film was coated with an ultraviolet ray curing paint for protective layer formation (KHC-T1, supplied by Kyoeisha Chemical Co., Ltd.) by the applicator method so as to ensure a thickness of 40 μm after drying, and the paint was dried at 80° C. for 10 min to form a protective layer. Then, 100 parts by mass of coating composition A and 10 parts by mass of coating composition B were stirred and mixed in a planetary centrifugal mixer (ARE-250, supplied by Thinky Corporation) to prepare a paint for coloring layer formation in which a polyolefin based hot melt adhesive accounted for 6 mass % of the total solid content. This paint for coloring layer formation was spread by the applicator method over the protective layer to ensure a thickness of 20 μm after drying, and the paint was dried at 80° C. for 10 min to form a coloring layer. The polyolefin based hot melt adhesive accounted for 6 mass % of the entire coloring layer. Subsequently, coating composition B was spread by the applicator method over the coloring layer so as to ensure a thickness of 20 μm after drying, and the paint was dried at 80° C. for 10 min to form an adhesive layer. The adhesive layer was formed only of the polyolefin based hot melt adhesive. Thus, a decorative molding film was obtained. The chrominance and stretching stress of the resulting decorative molding film and the peel strength between the decorative molding film and the molding are shown in Table 1. The film was low in chrominance and had a good color. The stretching stress was low, indicating an adequate moldability. The decorative layer was destroyed and could not be peeled off in the peel strength test, indicating a very strong adhesion.

Example 2

The mixing ratio between coating composition A and coating composition B was adjusted to prepare a paint for coloring layer formation in which a polyolefin based hot melt adhesive accounted for 3 mass % of the total solid content. The same procedure as in Example 1 except for using this paint for coloring layer formation was carried out to obtain a decorative molding film. The polyolefin based hot melt adhesive in the coloring layer accounted for 3 mass % of the entire coloring layer. The chrominance and stretching stress of the resulting decorative molding film and the peel strength between the decorative molding film and the molding are shown in Table 1. As compared to Example 1, the content of the polyolefin based hot melt adhesive in the coloring layer was lower, resulting in a smaller chrominance and a better color. On the other hand, the stretching stress was slightly larger, though at a sufficiently low level in terms of moldability. The decorative layer was destroyed and could not be peeled off in the peel strength test, indicating a very strong adhesion.

Example 3

The same procedure as in Example 1 except for producing an adhesive layer from coating composition C was carried out to obtain a decorative molding film. The adhesive layer was formed only of the polyolefin based hot melt adhesive. The chrominance and stretching stress of the resulting decorative molding film and the peel strength between the decorative molding film and the molding are shown in Table 1. The film was low in chrominance and had a good color. The stretching stress was low, indicating an adequate moldability. The decorative layer was destroyed and could not be peeled off in the peel strength test, indicating a very strong adhesion.

Example 4

The mixing ratio between coating composition A and coating composition B was adjusted to prepare a paint for coloring layer formation in which a polyolefin based hot melt adhesive accounted for 3 mass % of the total solid content. The same procedure as in Example 3 except for using this paint for coloring layer formation was carried out to obtain a decorative molding film. The polyolefin based hot melt adhesive in the coloring layer accounted for 3 mass % of the entire coloring layer. The chrominance and stretching stress of the resulting decorative molding film and the peel strength between the decorative molding film and the molding are shown in Table 1. As compared with Example 3, the content of the polyolefin based hot melt adhesive in the coloring layer was lower, resulting in a smaller chrominance and a better color. On the other hand, the stretching stress was slightly larger, though at a sufficiently low level in terms of moldability. The decorative layer was destroyed and could not be peeled off in the peel strength test, indicating a very strong adhesion.

Example 5

The same procedure as in Example 4 except for producing an adhesive layer from coating composition D was carried out to obtain a decorative molding film. The adhesive layer was formed only of the polyolefin based hot melt adhesive. The chrominance and stretching stress of the resulting decorative molding film and the peel strength between the decorative molding film and the molding are shown in Table 1. The film was low in chrominance and had a good color. The stretching stress was low, indicating an adequate moldability. The decorative layer was destroyed and could not be peeled off in the peel strength test, indicating a very strong adhesion.

Example 6

The mixing ratio between coating composition A and coating composition B was adjusted to prepare a paint for coloring layer formation in which a polyolefin based hot melt adhesive accounted for 9 mass % of the total solid content. The same procedure as in Example 1 except for using this paint for coloring layer formation was carried out to obtain a decorative molding film. The polyolefin based hot melt adhesive in the coloring layer accounted for 9 mass % of the entire coloring layer. The chrominance and stretching stress of the resulting decorative molding film and the peel strength between the decorative molding film and the molding are shown in Table 1. The stretching stress was virtually the same as that in Example 1, indicating an adequate moldability. The decorative layer was destroyed and could not be peeled off in the peel strength test, indicating a very strong adhesion. As compared to Example 1, however, the content of the polyolefin based hot melt adhesive in the coloring layer was higher, resulting in a chrominance of 1.5 and a deteriorated color.

COMPARATIVE EXAMPLE 1

The same procedure as in Example 1 except for producing a coloring layer from coating composition A alone was carried out to obtain a decorative molding film. The stretching stress of the resulting decorative molding film and the peel strength between the decorative molding film and the molding are shown in Table 1. The coloring layer contained no polyolefin based hot melt adhesive, resulting in a larger stretching stress and an inferior moldability. Furthermore, the peel strength was 4.9 N/cm, indicating an insufficient adhesion.

TABLE 1

|  |  | Example 1 | Example 2 | Example 3 | Example 4 | Example 5 | Example 6 | Comparative Example 1 |
|---|---|---|---|---|---|---|---|---|
| Total solid content adhesive in coloring layer (mass ratio) |  | 100:6 | 100:3 | 100:6 | 100:3 | 100:3 | 100:9 | 100:0 |
| Moldability | stretching stress (MPa) | 1.67 | 1.71 | 3.06 | 3.08 | 3.21 | 1.67 | 3.78 |

TABLE 1-continued

|  |  | Example 1 | Example 2 | Example 3 | Example 4 | Example 5 | Example 6 | Comparative Example 1 |
|---|---|---|---|---|---|---|---|---|
| Color | chrominance (ΔE value) | 0.8 | 0.5 | 0.7 | 0.5 | 0.4 | 1.5 | 0 (reference) |
| Adhesion | peel strength (N/cm) | decorative layer destroyed | decorative layer destroyed | decorative layer destroyed | decorative layer destroyed | decorative layer destroyed | decorative layer destroyed | 4.9 |

INDUSTRIAL APPLICABILITY

The decorative molding film can be used favorably for decoration of automobile parts and electric appliances, but it is not limited to them and can also be used favorably for other items that require decoration such as portable telephones, notebook computers, advertising displays, and furniture.

The invention claimed is:

1. A decorative molding film comprising:
a releasable base film provided with a protective layer,
a coloring layer containing a binder, a polyolefin based hot melt adhesive and pigment, and
an adhesive layer containing a polyolefin based hot melt adhesive stacked in that order on one side of the base film, wherein the content of the polyolefin based hot melt adhesive in the coloring layer is 2 mass % or more and 8 mass % or less of the entire coloring layer.

2. The decorative molding film as defined in claim 1, wherein both the polyolefin based hot melt adhesive contained in the coloring layer and the polyolefin based hot melt adhesive contained in the adhesive layer are modified polyolefin resins.

3. The decorative molding film of claim 1, wherein the content of the polyolefin based hot melt adhesive in the coloring layer is 2 mass % to 6 mass % of the entire coloring layer.

* * * * *